United States Patent [19]

Akabane et al.

[11] Patent Number: 4,853,723
[45] Date of Patent: Aug. 1, 1989

[54] CAMERA WITH FLASH DEVICE

[75] Inventors: Jun Akabane; Ken Moro, both of Tokyo; Masayasu Yamamoto, Kawasaki; Masaharu Hara; Yoshio Sekine, both of Tokyo, all of Japan

[73] Assignee: Nikon Corporation, Tokyo, Japan

[21] Appl. No.: 283,021

[22] Filed: Dec. 9, 1988

Related U.S. Application Data

[63] Continuation of Ser. No. 55,150, May 28, 1987, abandoned.

[30] Foreign Application Priority Data

May 30, 1986 [JP] Japan .............................. 61-81842[U]

[51] Int. Cl.4 ............................................ G03B 15/05
[52] U.S. Cl. ................................................. 354/145.1
[58] Field of Search ...................... 354/132, 141, 145.1

[56] References Cited

U.S. PATENT DOCUMENTS

| | | | |
|---|---|---|---|
| 3,521,540 | 7/1970 | Cavallo | 354/141 |
| 4,231,645 | 11/1980 | Davis et al. | 354/145.1 |
| 4,268,146 | 5/1981 | Johnson | 354/145.1 |
| 4,319,818 | 3/1982 | sawara | 354/145.1 |
| 4,350,420 | 9/1982 | Engelsmann et al. | 354/145.1 |
| 4,406,533 | 9/1983 | Yamamoto | 354/145.1 |

FOREIGN PATENT DOCUMENTS 55-2271 1/1980 Japan .
58-208735 12/1983 Japan .
61-66320 5/1986 Japan .

Primary Examiner—Michael L. Gellner
Attorney, Agent, or Firm—Shapiro and Shapiro

[57] ABSTRACT

A single-lens reflex camera includes a protruding housing portion enclosing a pentagonal prism and an eyepiece optical system. The housing portion has at least two lateral faces connecting a front face and a rear face. The camera includes a flash unit having two arm members fixed thereto. The two arm members can rotate about axis passing through the protruding portion between the lateral faces. The two arm members can assume a first position where the flash unit is disabled and a second position where the flash unit is enabled.

33 Claims, 6 Drawing Sheets

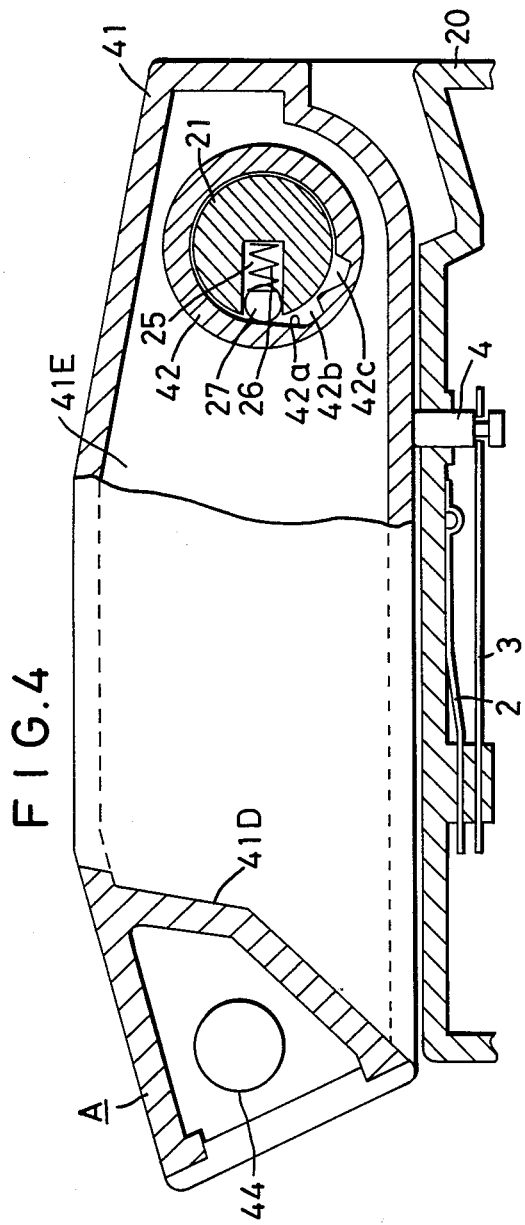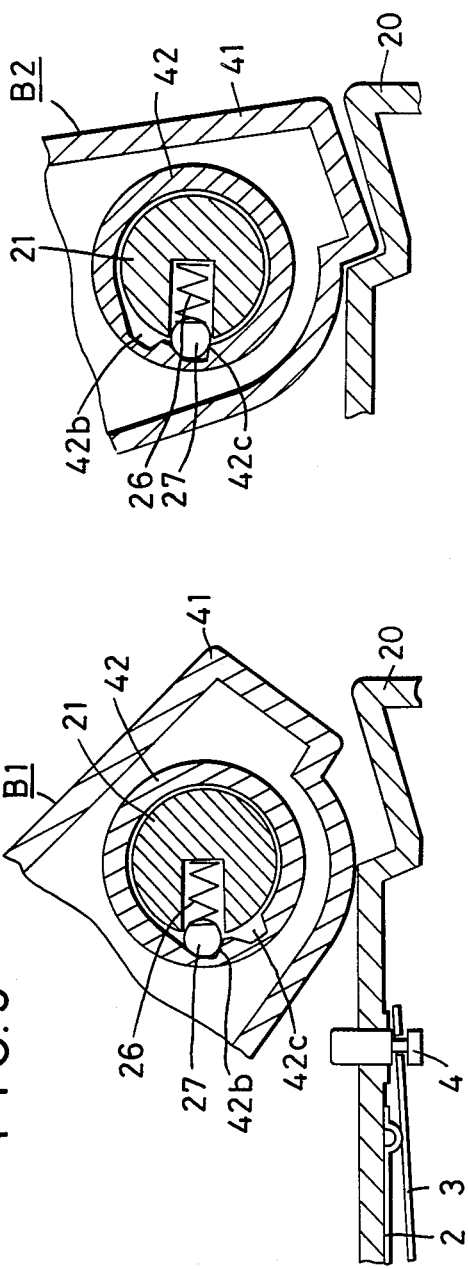

ental prism cover is folded from its standing state to the
CAMERA WITH FLASH DEVICE This is a continuation of application Ser. No. 055,150 filed May 28, 1987, now abandoned.

BACKGROUND OF THE INVENTION

1. Field of the Invention

The present invention relates to a photographic camera provided with a flash device.

2. Related Background Art

In the field of such cameras, there is already known, as disclosed in the Japanese Paten Laid-open No. 2271/1978, a single-lens reflex camers with flash device, in which a light-emitting unit of the flash device is articulated to the top of the pentagonal prism cover of the camera. The flash device is lifted up to be positioned farther away from the optical axis of the image-taking lens at use and, when not used, is folded back toward the eyepiece of the finder for being accommodated in a recess provided in the back of said pentagonal prism cover. In such known camera, the light-emitting face of the flash device is positioned upwards and is exposed to the outside, and is apt to be smeared or damaged while the unit is folded.

In order to resolve this drawback, there is already proposed, as disclosed in the Japanese Patent Laid-open No. 208735/1983, a single-lens reflex camera in which a light-emitting unit articulated to the top of the pentagonal prism cover is folded from its standing state to the front when not used, and is held along the front surface of the pentagonal prism cover so that the light-emitting face is positioned downwards.

However, in such conventional cameras with flash devices, the light-emitting unit is supported by a hinge shaft of limited strength provided at the top of narrow pentagonal prism case and is therefore unstably supported when it is lifted. Also, since the light-emitting face is positioned upward or downward in the folded state, the light-emitting unit has to be rotated by 90° or more for reaching the standing state for use. For this reason, the lead wires connecting the flash tube in the light-emitting unit with the main capacitor and the high-voltage circuit provided in the camera body are moved or twisted as said unit is rotated between the folded state and the standing state, thus reducing durability.

Furthermore, as disclosed in the Japanese Utility Model No. 66320/1986, there is already known a single-lens reflex camera with flash device, in which a light-emitting unit is provided at the upper front portion of the camera body opposite to the grip portion thereof. The unit is rotated approximately 180° about a hinge shaft, from a folded position along the front wall of the camera body to a lifted position where the light-emitting face is directed forward for use. In such camera, the camera body has a space for accommodating the battery, main capacitor, electric circuits, trigger coil, etc., and the rotatable unit principally contains the flash tube. In such case the lead wires connecting the flash tube with the electric circuits provided in the camera body are inevitably moved or twisted. Also, at the activation of the flash device, noises generated by the high-voltage trigger coil provided in the camera body adversely affect other control circuits in the camera, thus causing erroneous operation of the camera.

SUMMARY OF THE INVENTION

In consideration of the foregoing, an object of the present invention is to provide a camera with flash device in which the light-emitting unit requires only a limited angle of rotation between its folded position and its position for use, and in which the light-emitting face of the unit is safely protected in said folded position and is sufficiently separated from the optical axis of the image-taking lens in said position for use.

Another object of the present invention is to provide a camera with flash device in which the light-emitting unit is securely supported in its position of use is compact, and still has a space therein for accommodating at least the trigger coil.

The above-mentioned objects can be achieved, according to the present invention, by a structure in which the rotary shaft means of a rotatable light-emitting unit is provided at the rear side of the camera, with ends of the shaft means at both sides of the pentagonal prism cover house a finder optical system and protrudes on the upper part of the camera, and which said light-emitting unit of the flash device is positioned along the front surface of said pentagonal prism cover in the folded position, with the light-emitting face directed diagonally downwards in front of the camera. In this manner the distance from the light-emitting unit to the rotating shaft can be sufficiently long, so that the light-emitting face can be sufficiently separated from the optical axis of the image taking lens with a limited rotating angle. Also, the light-emitting face can be brought to a position substantially coinciding with the front side of the camera with a rotating angle smaller than 90°. Consequently the lead wires connecting the flash lamp of the light-emitting unit with the high-voltage circuit in the camera are subjected to relatively little twisting, resulting in a longer service life.

In addition, an increased distance between the bearings for the rotation shaft allows more secure support of the light-emitting unit at the position of use. Also, the trigger coil is incorporated in an arm of the arch-shaped light-emitting unit, so that electrical noises generated by said trigger coil in the position of use of said unit do not affect the electric circuits in the camera, such as the exposure control circuit or sequence control circuit. In this manner erroneous functions of the camera are prevented.

Still other objects of the present invention, and the features and advantages thereof, will become fully apparent from the following description which is to be taken in conjunction with the appended drawings.

BRIEF DESCRIPTION OF THE DRAWINGS

FIG. 4 is a cross-sectional view along a line IV—IV of FIG. 3;

FIGS. 5 and 6 are cross-sectional views for explaining a click stop mechanism of a rotary shaft shown in FIG. 4; wherein FIG. 5 shows a state in which the flash device is set in a normal flash position while FIG. 6 shows a state in which said unit is set in a bounce flash position;

DESCRIPTION OF THE PREFERRED EMBODIMENTS

Figure 1:
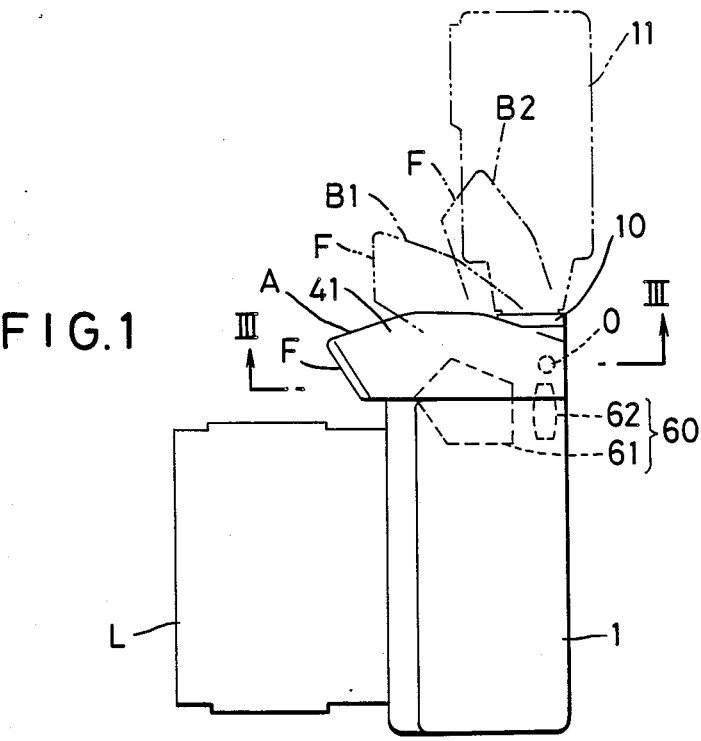
FIG. 1 is a schematic lateral view of a single-lens reflex camera with flash device embodying the present invention.
Figure 2:
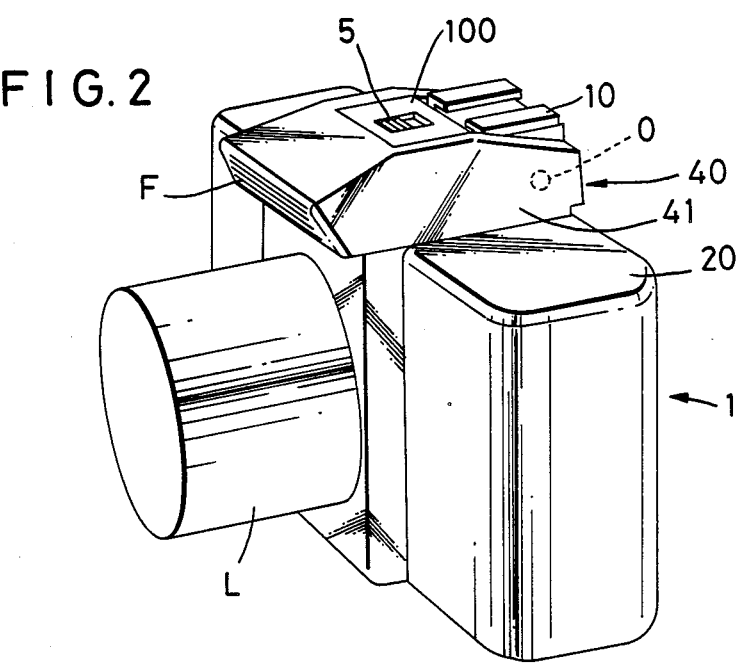
FIG. 2 is a perspective view of a single-lens reflex camera with flash device shown in FIG. 1.

FIG. 1 is a schematic lateral view of a single-lens reflex camera with flash device embodying the present invention; and FIG. 2 is a perspective view of said camera in which the flash device is locked in a folded position.

At the upper central part of the camera body 1 a flash device 40 mounted for rotation about a rotary shaft means 0 positioned at the rear side of the camera and above a finder optical system 60 as shown in FIGS. 1 and 2. More particularly, flash device 40 is rotatable from a folded position A (solid lines in FIG. 1) and positions B1, B2 (phantom lines in FIG. 1) for use. The position of use B1 is a normal flash position in which a light-emitting face F of the flash device is perpendicular to the optical axis of an image taking lens L and therefore faces an object to be photographed while the position B2 is a bounce flash position for so-called bounce flashing in which the light-emitting face F is directed above the object. In the present embodiment the flash device 40 is rotated, from the folded position A, by about 35° to reach the position of use B1, or by about 80° to reach the position B2. In FIG. 1, a pentagonal prism 61 and an eyepiece constitute the finder optical system 60. An accessory shoe 10 is provided for accepting an additional electronic flash device 11 different from the flash device 40.

Figure 3:
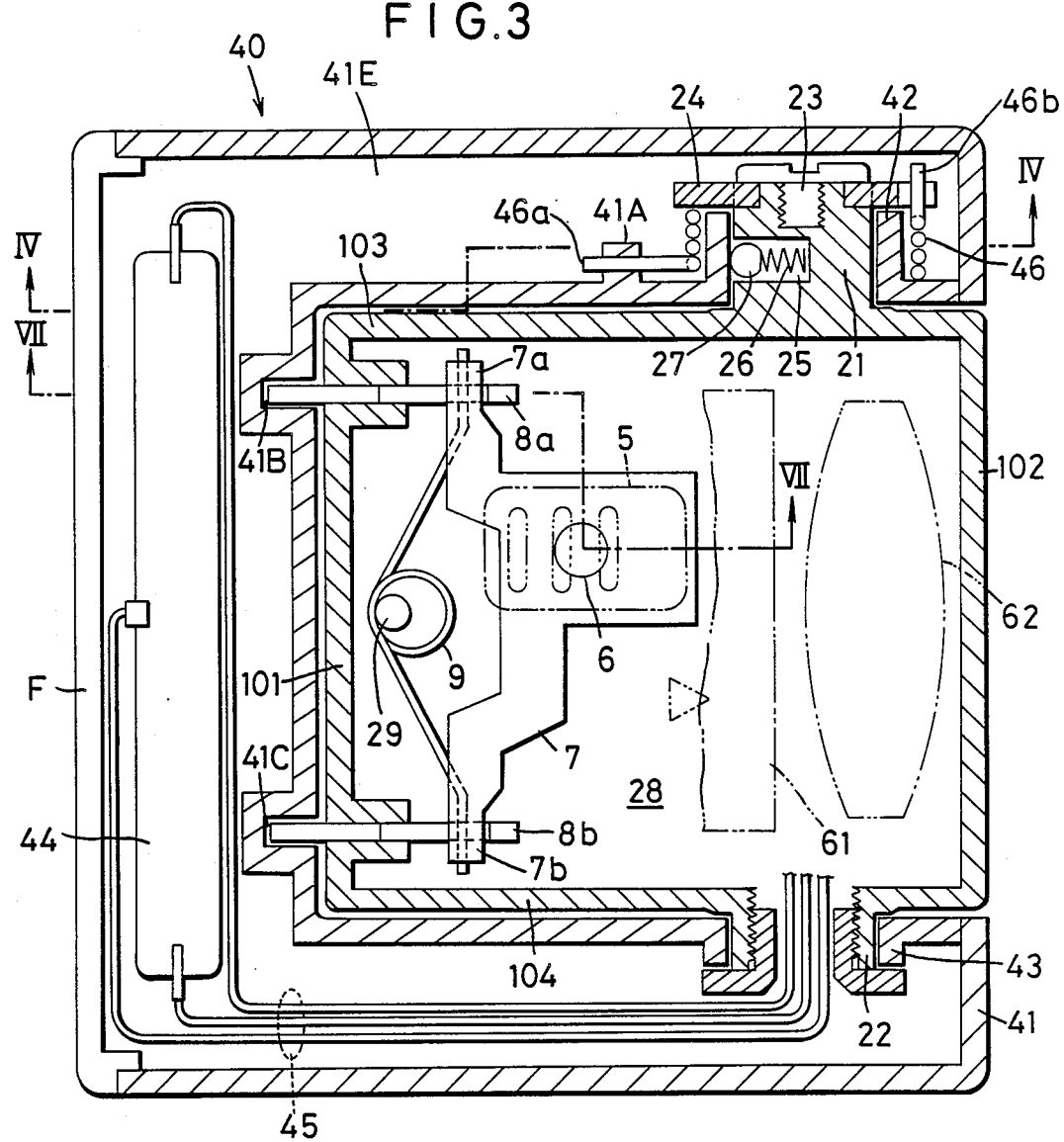
FIG. 3 is a cross-sectional view along a line III—III in FIG. 1.

Now referred also to FIG. 3 which is a cross-sectional view along a line III—III in FIG. 1, an upper cover (pentagonal prism cover) 100 positioned over the prism 61 surrounds the finder optical system 60 composed of the eyepiece 62 and said prism 61. Said cover 100 is provided, on lateral faces 103, 104 thereof, respectively with a solid support shaft 21 and a hollow support shaft 22 on the same axis, and said shafts 21, 22 rotatably support, through bearings 42, 43, an arch-shaped support member 41 constituting an outer part of the flash device 40. As shown in FIG. 3, the support shafts 21, 22 extending outwardly to the support frame 41 are positioned at the rear side of the lateral walls 103, 104 of the upper cover 100 surrounding the sides of the finder optical system 60. In the support frame 41 there is provided a flash lamp 44 such as a xenon lamp, from which lead wires 45 are connected through the center of the hollow support shaft 22 to a voltage elevating circuit V1 (FIG. 10) provided in the camera body 1. The flahs tube 44 is covered, at a side corresponding to the front side of the camera, for example with a translucent plastic plate which constitutes the light-emitting face F. Reference number 102 indicates the back side of the upper cover 100.

In the following discussion there will be explained a rotating mechanism for the flash device 40. Referring to FIG. 3, around the solid support shaft 21 and the bearing 42 there is provided a torsion coil spring 46, of which an end 46a engages with a hook pin 41A protruding from the support frame 41 while the other end 46b is connected to a spring ring 24 fixed to the solid support shaft 21 with a screw 23. The support frame 41 is thus constantly biased toward the positions of use B1, B2 (or above the plane of FIG. 3). Support frame 41 is held fixed against the action of the biasing force at the folded position A and the positions of use B1, B2 as will now be explained.

In said positions of use B1, B2, the support frame 41 is supported and fixed in the following manner. As shown in FIG. 3, the shaft 21 is provided on the periphery thereof with a hole 25, in which a compression coil spring 26 and a ball 27 are inserted, whereby said ball 27 is biased to the outside by said spring 26. On the other hand, on the internal periphery of the bearing 42 fitted on the solid support shaft 21, there are formed a cam face 42a and cam grooves 42b, 42c as shown in FIGS. 4 to 6, and the ball 27 engages with said cam face 42a in the folded position A.

When the support frame 41 is rotated from the folded position A to the position of use B1 (FIG. 5), the ball 27 engages with the cam groove 42b, whereby the support frame 41 is fixed in said position B1. When the support frame 41 is further rotated to the position of use B2 (FIG. 6), the ball 27 then engages with the cam groove 42c whereby the support frame 41 is fixed in said position B2. As shown in FIGS. 4 and 5, elastic switch contacts 2, 3 are provided inside an upper cover 20 camera body 1, and said contact 3 is provided, at an end thereof, with a pin 4 penetrating through and projecting from the upper cover 20 by the elastic force of said contact 3. Thus, when the support frame 41 is in the folded position A, the pin 4 is pushed into the upper cover 20 as shown in FIG. 4 so that the movable contact 3 is separated from the fixed contact 2. On the other hand, when the support frame 41 is maintained at the position B1 or B2, the movable contact 3 touches the fixed contact 2 as shown in FIG. 5 to enable the use of the flash device.

Figure 7:
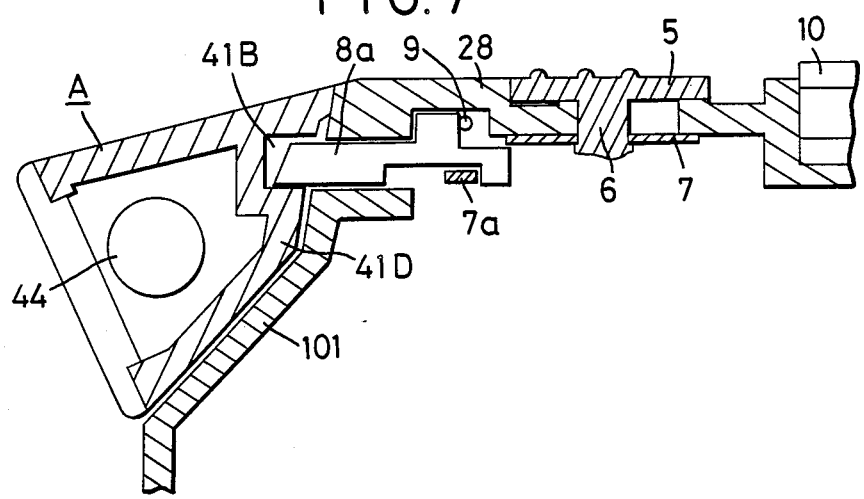
FIG. 7 is a cross-sectional view along a line VII—VII shown in FIG. 3, showing a state in which the flash device is locked in a folded state.
Figure 8:
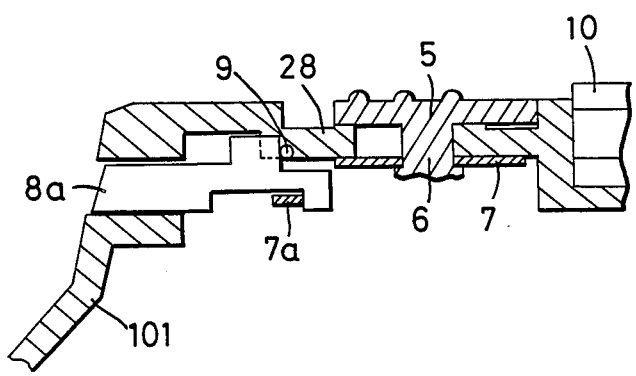
FIG. 8 is a cross-sectional view of a locking device showing a state in which the locking of the flash device shown in FIG. 7 is released.
Figure 9:
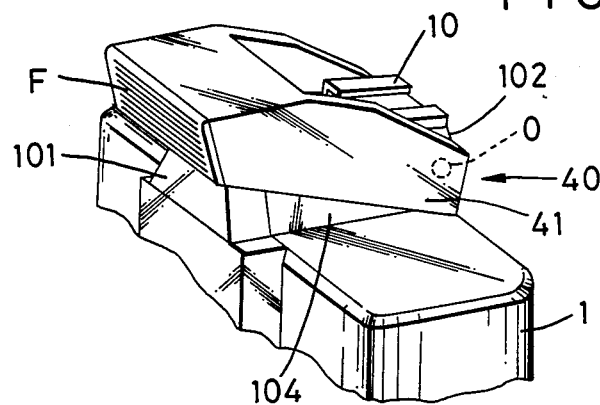
FIG. 9 is a perspective view of the flash device shown in FIG. 1 in a state rotated to a normal flash position.

In the following discussion there will be explained a locking mechanism in the folded position A, while making reference to FIG. 3, and the cross-sectional views shown in FIGS. 7 and 8.

An upper wall 28 of the upper cover 100 is provided with a slidable knob 5, connected through a pin 6 to a lever 7 positioned inside said upper wall 28. Said lever 7 is provided, on both ends 7a, 7b thereof, with fingers 8a, 8b protruding to the front of the camera from a front face 101 of the upper cover 100. Said fingers 8a, 8b are constantly biased toward the front of the camera (toward left in FIG. 3) by means of a torsion coil spring 9 provided on a pin 29 protruding from the upper cover 100. Corresponding to the fingers 8a, 8b, the support frame 41 is provided with holes 41B, 41C into which the fingers 8a, 8b are inserted as shown in FIGS. 3 and 7 when the support frame 41 is in the folded position, thereby locking the support frame against the rotative force of the torsion coil spring 46.

When the knob 5 is moved toward the rear of the camers (the right in FIG. 8) against the biasing force of the spring 9, the fingers 8a, 8b are retracted from the holes 41B, 41C, where upon the support frame 41 is rotated toward the position B1 and B2 shown in FIG. 1 by the force of the torsion coil spring 46. Then, as shown in FIG. 5, the ball 27 engages with the cam groove 42b to stop said rotation, whereby the support frame 41 is fixed at the upward slanted position B1. In this state shown in FIG. 1 the light-emitting face F is directed to the object to be photographed. When the support frame 41 is further rotated from said position B1 to the position B2, the ball 27 is disengaged from the cam groove 42b and the support frame 41 is rotated by the force of the torsion coil spring 46. Then the ball 27 engages with the cam groove 42c as shown in FIG. 6 to fix the support frame 41 at said position B2. In this state the light-emitting face F is directed higher than the object, thereby enabling so-called bounce flash photography.

As the support frame 41 in the position B1 or B2 is manually rotated toward the folded position A, an intermediate wall 41D (FIG. 7) of the support frame 41 enclosing the flash lamp 44 presses respective front slanted faces of the fingers 8a, 8b protruding from the upper case 100.

When the support frame 41 reaches said position A, said fingers 8a, 8b engage with the holes 41B, 41C under the force of spring 9 whereby the support frame 41 is again fixed in the folded position. As will be appreciated from FIGS. 3 and 7, an upper wall 28 of cover 100 is exposed between the bearings 42, 43 of the square-C shaped support frame 41 there is an accessory shoe 10 provided on upper wall 28, as shown in FIG. 2, for mounting an additional flash unit 11 (represented by broken lines in FIG. 1), which can be activated as an alternative to the flash device 40.

Lead wires 45 (FIG. 3) pass through the center of the support shaft 22 and are prevented from excessive twisting or movement, thus providing a longer service life.

In the following discussion there will be explained the circuit structure of the present embodiment, while making reference to FIG. 10.

Figure 10:
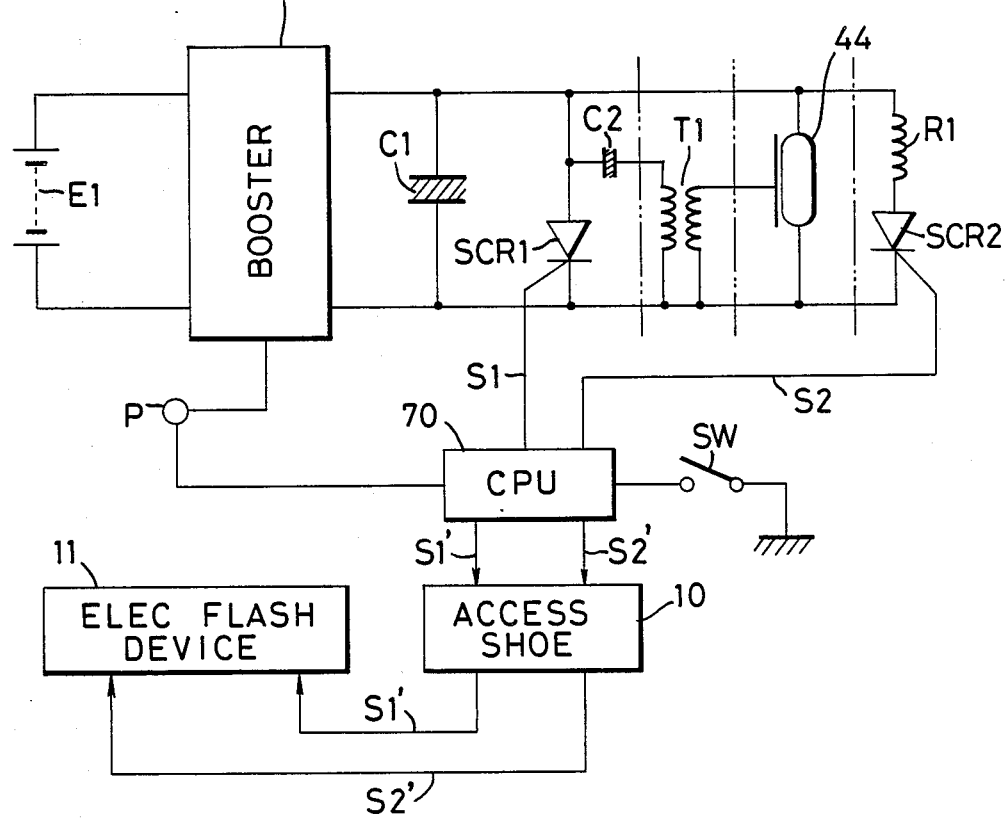
FIG. 10 is a schematic circuit diagram of the flash device embodying the present invention.

As shown in FIG. 10, a power source E1 is connected, through a switch SW composed of the contacts 2, 3, to a voltage booster circuit V1 provided with a control terminal P for controlling said voltage booster by a signal from a central processing unit (CPU) 70. Said voltage booster is further connected to a main capacitor C1. A thyristor SCR1 which is activated by a pulse signal from CPU 70 for triggering a is connected to a trigger capacitor C2, which is in turn connected to the primary side of a trigger coil T1. The secondary side thereof is connected to a xenon flash tube 44. A thyristor SCR2 is activated by a pulse signal for terminating the flash, supplied from the CPU. In the present embodiment, the CPU, main capacitor C1, trigger capacitor C2, thyristors SCR1, SCR2, resistor R1, and trigger coil T1 are placed in the camera body, while the xenon flash tube 44 is provided in the flash device 40 articulated to the camera body 1.

The above-explained circuit functions in the following manner. Prior to photographing with flash, the flash device 40 is rotated upwards to close the switch SW. In the present embodiment, said switch SW is closed as shown in FIG. 5 to enable the use of the flash device when the flash device 40 is rotated to the position of use B1 or B2. In the folded position A, said switch SW remains open, so that the flash device cannot be used. When said switch SW is closed, the control signal from the CPU is supplied through the control terminal P to activate the voltage booster, thereby charging the main capacitor C1 to a voltage of about 330 V. Simultaneously, the trigger capacitor C2 is charged with an electric charge corresponding to the capacitance thereof. When the shutter of hte camera is released, a synchronization contact (not shown) provided in the camera body 1 is closed, whereby the CPU 70 emits a pulse signal S1 for starting the flash. The thyristor SCR1 is triggered at the rise of said start pulse, whereby the trigger cpacitor C2 is discharged through said thyristor SCR1. Said discharge induces a current in the primary side of the trigger coil T1, thus generating a high voltage at the secondary side thereof and thus triggering the xenon flash tube 44. Thus the charge in the main capacitor C1 is discharged through said flash tube 44, generating a flash therefrom. As the flash is projected onto the object being photographed the reflected light is transmitted through the lens L and a diaphragm (not shown) and illuminates a photographic film, and the reflected light therefrom is guided to a photosensor (not shown). The CPU measures the amount of light falling on the film based on a detection signal from said photosensor, and generates a signal S2 for terminating the flash when said quantity reaches an appropriate value. Said signal S2 activates the thyristor SC2, whereby the main capacitor C2 is now discharged through the resistor R1. In the embodiment shown in FIG. 3, the trigger coil T1 is provided in the camera body 1, so that the flash device 40 contains the flash tube 44 only.

The CPU 70 prohibits the generation of a flash start pulse S1' and a flash terminating pulse S2' when the switch SW is closed, and prohibits the generation of the aforementioned signals S1 and S2 when said switch SW is open. In this manner the CPU 70 activates either the flash device 40 or the electronic flash unit 11 according to the state of the switch SW.

As will be apparent from FIG. 3, the arm of the support frame 41 corresponding to the bearing 42 and fitted with the shaft 21 has a space 41E suitable for housing the trigger coil T1. It is therefore possible to place said trigger coil T1 in said space as shown in FIG. 11.

Figure 11:
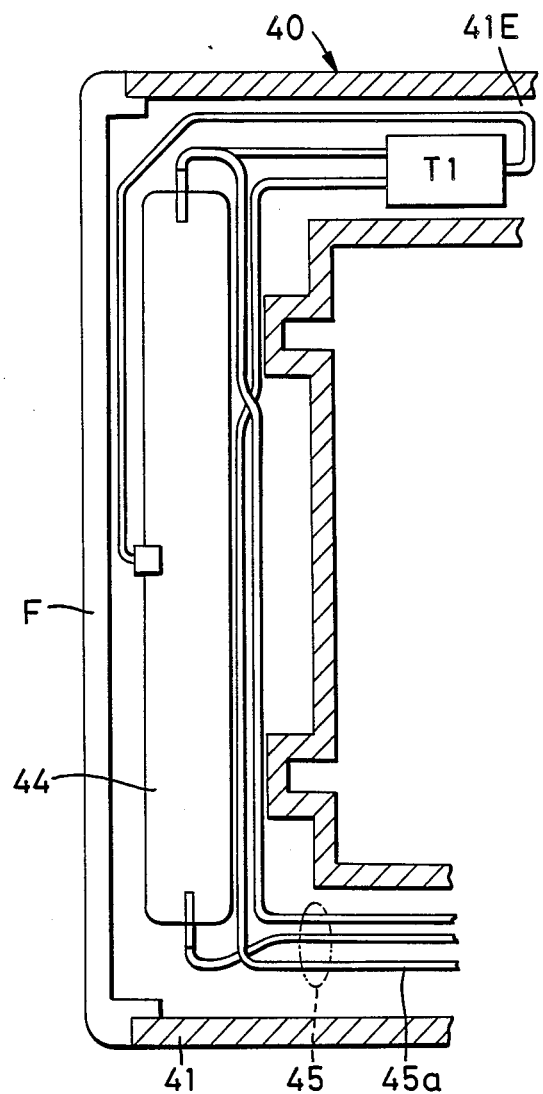
FIG. 11 is a partial cross-sectional view of a flash device according to another embodiment of the present invention, wherein a trigger coil is provided in a supporting frame of the device shown in FIG. 3.

If the trigger coil T1 is placed in an arm of the support frame 41 of the flash device 40 as shown in FIG. 11, the trigger coil T1 will be moved away from the camera body 1 when the flash device is rotated from the folded position A to the operating position B1 or B2. Thus, the trigger coil will be spaced substantially from the electric circuits in the camera body 1, such as an exposure control circuit, a sequence control circuit, etc. Consequently, the noises generated by the trigger coil T1 do not affect such electric circuits, and the erroneous function of the camera is effectively prevented. In practice integrated circuits for light measurement and exposure control are often placed on top of the pentagonal prism, but the above-explained embodiment in which the trigger coil T1 is placed in the flash device 40 effectively prevents adverse effects of trigger coil electrical noise on such integrated circuits as well.

Also, in such an embodiment the lead wires connecting the trigger coil T1 with the trigger capacitor C2 placed in the camera body 1 are contained in the flash device 40 and do not pass the vicinity of the electric circuits in the camera body 1. This contributes to the reduction in noise effects on such circuits.

In the embodiment shown in FIG. 11, the flash device 40 only contains the flash lamp 44 and the trigger coil T1 only. It is, however, possible also to incorporate the trigger capacitor C2 and thyristor SCR1, and such an arrangement is free from the influence of noise generated by the high voltage of the trigger coil T1.

We claim:

1. A single-lens reflex camera comprising:

a pentagonal prism;

an eyepiece optical system for guiding light from said pentagonal prism to an observer;

housing means provided with a protruding portion which houses said pentagonal prism and said eyepiece optical system and which is provided with a rear face to be directed to the observer, a front face to be directed to an object to be photographed, and two lateral faces connecting said rear and front faces;

a flash unit having a light-emitting face for emitting flash light toward the object to be photographed;

two arm members fixed to respective ends of said flash unit and having a rotary axis at a position passing through said protruding portion, said arm members being disposed to either side of said protruding portion and adapted to integrally swing, with said protruding protion therebetween, about said rotary axis between a first position in which said flash unit is disabled and a second position in which said flash unit is enabled, said light-emitting face being approximately directed to the object to be photographed when said two arm members are in said first position and being directed substantially parallel to the optical axis of a photograph-taking lens of the camera when said two arm members are in said second position;

a mounting member provided on said housing means and adapted for mounting an external electronic flash device; and control means responsive to movement of said arm members from said first position to said second position for prohibiting an external electronic flash device mounted to said mounting member from emitting flash light toward the object to be photographed.

2. A camera according to claim 1, further comprising means for fixing said flash unit with said arm members at said first position.

3. A camera according to claim 1, which further comprises means for detection that said two arm members are in said second position and for generating a detection signal upon said detection and wherein said control means is responsive to said detection signal to prohibit the external electronic flash device from emitting flash light toward the object.

4. A camera according to claim 3, wherein said control means is adapted to prohibit flashing operation of said flash unit when said detection signal is not generated.

5. A camera according to claim 4, wherein said control means is adapted to supply the electronic flash device, through said mounting member, with a first control signal for activating the electronic flash device and to supply said flash unit with a second control signal for activating said flash unit, and said control means is further adapted to prohibit the supplying of said second control signal when said detection signal is not generated and to prohibit the supplying of said first control signal when said detection signal is generated.

6. A camera according to claim 1, further comprising a flash tube provided in said flash unit; a trigger coil for triggering said flash tube; and voltage booster means for providing an elevated voltage to said trigger coil; wherein said trigger coil is placed in one of said two arm members and said voltage booster means is placed in said housing means.

7. A camera according to claim 1, further comprising a flash tube provided in said flash unit; electric power supply means provided in said housing means; and connection means for electrically connecting said flash tube and said electric power supply means through said rotary axis.

8. A camera according to claim 7, comprising a first opening in an area of said rotary axis on one of said two lateral faces, and a second opening formed in an area of said rotary axis on one of said two arm members corresponding to said lateral face in such a manner as to be adjacent to said first opening, wherein said connection means passes through said first and second openings.

9. A camera according to claim 7, wherein said connection means is composed of lead wires.

10. A camera according to claim 1, wherein said control means is responsive to mvement of said arm memberrs from said second positio to said first position to prohibit said flash unit from emitting flash light toward the object to be photographed.

11. A camera comprising:

camera housing means provided with a mounting member adapted for mounting an external electronic flash device;

flash means for emitting flash light independently of the electronic flash device;

means supporting said flash means on said camera housing means for movement between a first position and a second position; and control means responsive to movement of said flash means from said first position to said second position for prohibiting an external electronic flash device mounted on said mounting member from emitting flash light and responsive to movement of said flash means from said second position to said first position for prohibiting said flash means from emitting flash light.

12. A camera according to claim 11, wherein said flash means is enabled to emit flash light when said flash means is at said second position, and the electronic flash device is enabled to emit flash light when said flash means is at said first position.

13. A camera according to claim 12, further comprising electric power supply means including a voltage booster circuit disposed within said camera housing means, wherein said flash means comprises a second housing means which is independent of said camera housing means and which houses a flash tube and a trigger coil electrically connecting said voltage booster circuit to said flash tube, and wherein said supporting means supports said second housing means for movement between said first and second positions.

14. A camera according to claim 13, wherein said supporting means supports said flash means for swinging movement between said first and second positions about a predetermined axis.

15. A camera according to claim 14, which further comprises a pentagonal prism and an eyepiece optical system for guiding light from said pentagonal prism to an observer, and wherein said camera housing means has a protruding portion which houses said pentagonal prism and said eyepiece optical system, said mounting member is disposed on said protruding portion, and said flash means is disposed on said protruding portion such that said flash means is situated toward the front of said camera housing means relative to said mounting means.

16. A camera according to claim 15, wherein said predetermined axis is disposed between said mounting member and said eyepiece optical system.

17. A single-lens reflex camera, comprising:
a pentagonal prism;
an eyepiece optical system for guiding light from said pentagonal prism to an observer;
first housing means provided with a protruding portion which houses said pentagonal prism and said eyepiece optical system, said protruding portion having a rear face to be directed to the observer, a front face to be directed to an object to be photographed, and two lateral faces connecting said rear face and said front face, one of said two lateral faces having a first opening;
second housing means having first arm means and second arm means and being adapted to swing between a first position and a second position about a rotary axis passing through said first opening, said first arm means having a surface which faces said one of said two lateral faces and has a second opening, said second arm means having a surface which faces the other of said two lateral faces and has a third opening, said second opening and said third opening being disposed so that said rotary axis passes through said second opening and said third opening;
flash means provided in said second housing means for emitting flash light;
an electric circuit provided in said first housing means;
line means for electrically connecting said flash means and said electric circuit through said first opening and said second opening;
biasing means provided in said second arm means for biasing said second housing means from said first position toward said second position, said biasing means being disposed adjacent to said third opening; and
releasable locking means for releasably locking said second housing means in said first position.

18. A camera according to claim 17, wherein said releasable locking means includes a release member operable to unlock said second housing means, and said second housing means swings from said first position to said second position in respone to operation of said release member.

19. A camera according to claim 17, which further comprises means for prohibiting said flash means from emitting flash light when said flash means is in said first position.

20. A camera according to claim 17, wherein said biasing means has a torsion spring wound about said rotary axis.

21. A camera according to claim 17, which further comprises a mounting member provided on said protruding portion and adapted for mounting an external electronic flash device, and wherein said rotary axis is disposed between said eyepiece optical system and said mounting member.

22. A single-lens reflex camera, comprising:
a pentagonal prism;
an eyepiece optical system for guiding light from said pentagonal prism to an observer;
first housing means housing said pentagonal prism and said eyepiece optical system;
a flash lamp for emitting flash light;
second housing means having a main body and two arm means protruding from said main body, said flash lamp being provided in said second housing means;
a pair of support members for supporting said two arm means with respect to said first housing means such that said second housing means is rotatable about a predetermined axis between a first position and a second position, one of said pair of support members having a first opening, one of said two arm means having a second opening;
an electric circuit provided in said first housing means;
line means passing through said first and second openings for electrically connecting said flash lamp to said electric circuit; and
biasing means for biasing said second housing means from said first position toward said second position, said biasing means being disposed adjacent to the other of said pair of support members.

23. A camera according to claim 22, which further comprises control means for inhibiting said flash lamp from emitting flash light when said second housing means is at said first position.

24. A camera according to claim 22, wherein said two arm means are fixed to respective ends of said main body.

25. A camera according to claim 22, wherein said other of said pair of support members is a pole-like member extending in a direction along said predetermined axis, and said biasing means has a torsion spring provided around said pole-like member.

26. A camera according to claim 25, wherein said pair of support members is disposed on said first housing means, and wherein said torsion spring is disposed within said other of said two arm means.

27. A camera according to claim 26, wherein said torsion spring acts between said other of said pair of support members and said other of said two arm means.

28. A single-lens reflex camera comprising:
a pentagonal prism;
an eyepiece optical system for guiding light from said pentagonal prism to an observer;
housing means provided with a protruding portion which houses said pentagonal prism and said eyepiece optical system and which is provided with a rear face to be directed to the observer, a front face to be directed to an object to be photographed, and two lateral faces connecting said rear and front faces;
electric power supply means provided in said housing means;
a flash unit having a flash tube provided therein and a light-emitting face for emitting flash light toward the object to be photographed;
two arm members fixed to respective ends of said flash unit and having a rotary axis at a position passing through said protruding portion, said arm members being disposed to either side of said protruding portion and adapted to integrally swing, with said protruding portion therebetween, about said rotary axis between a first position in which said flash unit is disabled and a second position in which said flash unit is enabled, said light-emitting face being approximately directed to the object to be photographed when said two arm members are in said first position and being directed substantially parallel to the optical axis of a photograph-taking lens of the camera when said two arm members are in said second position;

one of said lateral faces of said housing means having a first opening in an area of said rotary axis, and a corresponding one of said arm members having a second opening in an area of said rotary axis and adjacent to said first opening; and connection means passing through said first and second openings and connecting said flash tube to said electric power supply means.

29. A single-lens reflex camera, comprising:

a pentagonal prism;

an eyepiece optical system for guiding light from said pentagonal prism to an observer;

first housing means housing said pentagonal prism and said eyepiece optical system;

a flash lamp for emitting flash light;

second housing means having a main body and two arm means protruding from said main body, said flash lamp being provided in said second housing means;

a pair of support members for supporting said two arm means with respect to said first housing means such that said second housing means is movable between a first position and a second position, one of said pair of support members having a first opening, one of said two arm means having a second opening;

an electric circuit provided in said first housing means;

line means passing through said first and second openings for electrically connecting said flash lamp to said electric circuit; and biasing means for biasing said second housing means from said first position toward said second position, said biasing means being disposed adjacent to the other of said pair of support members.

30. A camera according to claim 29, which further comprises control means for inhibiting said flash lamp from emitting flash light when said second housing means is at said first position.

31. A camera according to claim 29, wherein said two arm means are fixed to respective ends of said main body.

32. A camera according to claim 29, wherein said support members are pole-like.

33. A camera according to claim 32, wherein said pole-like members are disposed on said first housing means.

* * * * *